Figure 1:
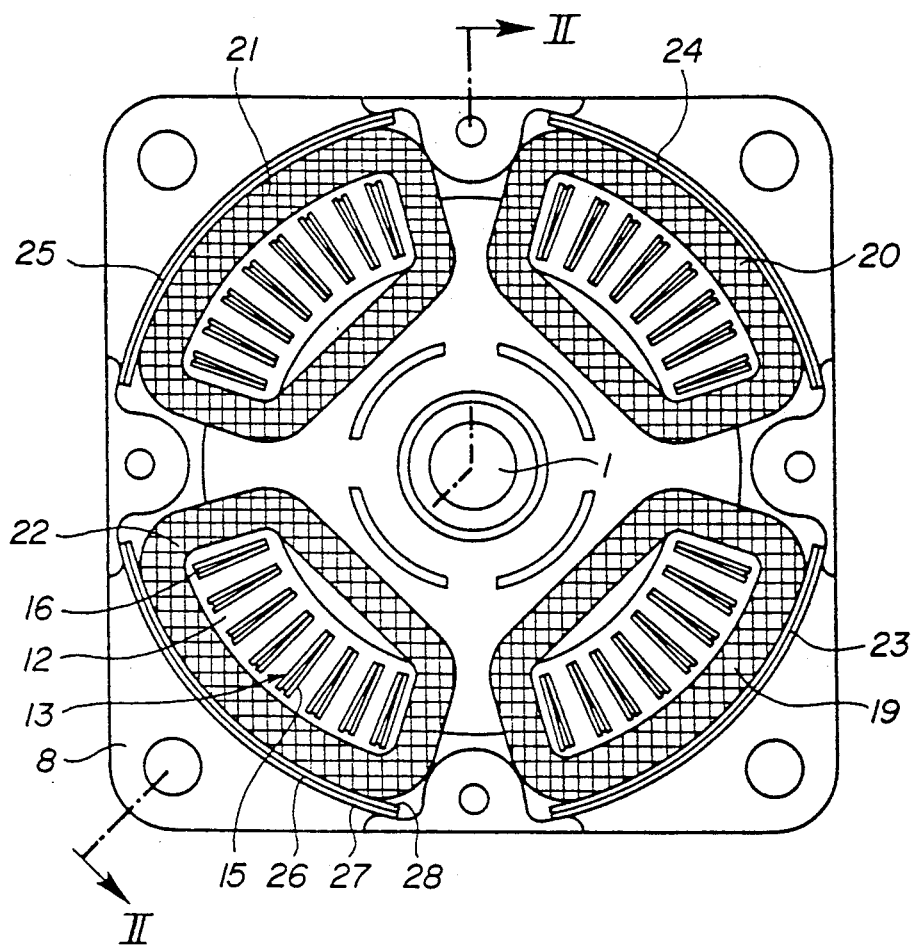

United States Patent [19]

Oudet

[11] Patent Number: 5,053,667

[45] Date of Patent: Oct. 1, 1991

[54] DI- OR POLYPHASE SYNCHRONOUS ELECTRIC MOTOR WITH A DISC-SHAPED ROTOR

[75] Inventor: Claude Oudet, Besancon, France

[73] Assignee: Portescap, Switzerland

[21] Appl. No.: 499,366

[22] PCT Filed: May 5, 1989

[86] PCT No.: PCT/CH89/00082

§ 371 Date: Feb. 9, 1990

§ 102(e) Date: Feb. 9, 1990

[87] PCT Pub. No.: WO89/12346

PCT Pub. Date: Dec. 14, 1989

[30] Foreign Application Priority Data

Jun. 10, 1988 [CH] Switzerland .......................... 2340/88

[51] Int. Cl.⁵ ................................................ H02K 1/18
[52] U.S. Cl. ..................................... 310/268; 310/162;
310/258; 310/254; 310/190; 310/191
[58] Field of Search ............... 310/268, 156, 162, 254,
310/112, 49 R, 190, 179, 181, 258, 191, 209

[56] References Cited

U.S. PATENT DOCUMENTS 4,316,112  2/1982  Waldron et al. ................. 310/258
4,891,538  1/1990  Oudet ............................... 310/162

FOREIGN PATENT DOCUMENTS 2078296  11/1971  France .
2121040   8/1972  France .
2067025   7/1981  United Kingdom .

Primary Examiner—Steven L. Stephan
Assistant Examiner—Edward H. To
Attorney, Agent, or Firm—Woodard, Emhardt, Naughton Moriarty & McNett

[57] ABSTRACT

The stator of this flat magnetized-rotor motor comprises sets of pole pieces, arranged substantially radially, the sets being surrounded by corresponding electrical control coils. Separate yoke portions, having surface portions of axially symmetric design, are arranged in contact with the pole pieces of a corresponding set. The flat portions each consist of two sheet elements, forming between them an angle; the portions are inserted radially in the respective slots of a support portion of a stator element. With this arrangement it is possible to produce high-performance motors, at very low cost and whose dimensions in the radial direction are extremely small.

5 Claims, 1 Drawing Sheet

DI- OR POLYPHASE SYNCHRONOUS ELECTRIC MOTOR WITH A DISC-SHAPED ROTOR

The present invention is concerned with a di- or polyphase synchronous electric motor comprising a rotor part shaped as a plane annular disc, magnetized so as to exhibit on each of its plane surfaces at least one series of magnetic poles disposed regularly along an annular zone, said rotor part being integral with a shaft of the motor mounted rotatably with respect to a stator assembly, this stator assembly comprising at least two groups of polar parts of a substantially plane configuration disposed substantially radially with respect to the motor shaft at least on one side of the rotor part, each of the polar parts forming part of a respective elementary magnetic circuit, having a gap in which is disposed said rotor part, the stator assembly further comprising at least two electric control coils, each surrounding at least one of said groups of polar parts.

In motors of this type, as they are described for example in the international patent application published under No WO 87/03751 or, in another embodiment, in the Swiss patent No. 637 508, the elementary magnetic circuits are closed by portions of pieces made by sintering or made out of sheets of a permeable material, forming the polar parts of the stator.

These motors generally have a relatively high cost or price and they have outside dimensions which are rather important by comparison with the diameter of their rotor.

The invention is mainly aimed at remedying this drawback and at providing a motor, the stator of which is of a particularly simple and inexpensive structure, and the dimensions of which in the radial direction are reduced to a minimum.

For this purpose, the motor according to the invention has the particularities indicated in claim 1. Claims 2 to 6 describe preferred embodiments of such a motor.

Figure 2:
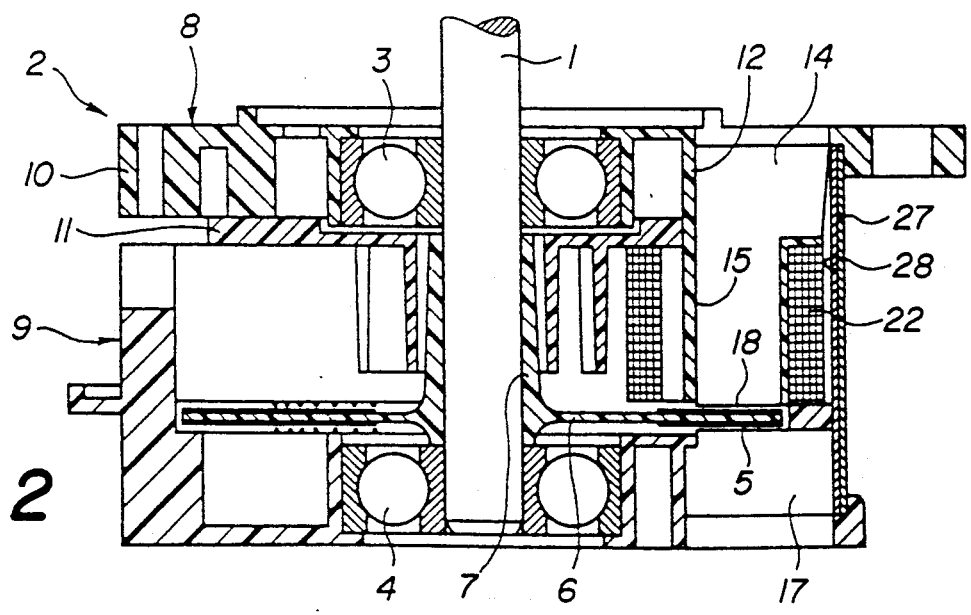

Other features and advantages of a motor according to the invention shall become apparent from the description given hereafter, by way of example, one embodiment of this motor being illustrated in the appended drawing, in which FIG. 1 is a bottom view of the upper part of the stator assembly of a motor according to the invention, and FIG. 2 is an axial cross-sectional view of the motor, taken along line II—II of FIG. 1.

The motor shown in FIGS. 1 and 2 comprises a shaft 1 rotatably mounted in a stator assembly referenced 2, by means of two ball bearings 3 and 4. A magnetized annular disc 5 is fixed on an annular part of a rotor support 6, the latter being further provided with a tubular part 7, integral with the shaft 1. The disc 5 is magnetized axially so as to have on each of its faces, along an annular zone, magnetic poles, preferably of alternating polarity, as in the case of the motor described in the above-mentioned Swiss patent No 637 508, the functioning of which is similar to that of the present motor.

The stator assembly 2 comprises primarily two subassemblies, namely an upper half sector 8 and a lower half stator 9. As shown in particular in FIG. 2, the upper half stator 8 comprises two parts made of a plastic material, 10 and 11, the part 10 comprising, in particular, the support portions 12 of the polar parts 13, each made of two pieces of a Fe-Si sheet, such as 14 (FIG. 2). The support portions 12 have slots 15 accessible axially and the side walls of which are disposed radially. The pieces 14 are inserted into these slots so as to be applied against said side walls and therefore, to be themselves disposed substantially radially with respect to the motor shaft. This position and, in particular, the spacing of the pieces 14 at their outer edge can be ensured by a convex portion, such as shown at 16, formed in the slots, on the outer side thereof. Thus, the polar parts 13 have a transverse section corresponding precisely to the configuration of the magnetic poles formed on the disc 5. Similarly, the lower half stator 9 comprises polar parts, formed by pieces of sheet such as 17 (FIG. 2), disposed opposite the pieces 14, so as to form a gap 18 in which passes the magnetized disc 5.

In the present motor, the pairs of polar parts thus disposed opposite each other are arranged in four groups, each group being coupled with a respective electric control coil, from amongst the coils 19, 20, 21, 22, as can be seen in FIG. 1. Each pair of polar parts is part of an elementary magnetic circuit which is closed by a yoke part, common to a group of pairs of polar parts. Four yoke parts 23, 24, 25, 26 are thus provided in the present motor.

The yoke parts are, in the present example, formed by pieces of a magnetically permeable sheet, for example made of Fe—Si, these pieces being cut out and bent to form parts shaped substantially as portions of a surface of a revolution cylinder, as shown in FIG. 1, viewed in the axial direction. Two pieces such as 27, 28 can be disposed one against the other in each yoke part and they are maintained together in the two half stators 8, 9, as shown in particular in FIG. 2. FIG. 2 further shows how pieces of sheet, such as 14 and 17, come in contact by their outer side with the corresponding yoke part 26. During assembly, the pieces 17 and 26 are, for example, disposed in the lower half stator 9, and then the upper half stator 8, into which the pieces 14 had been inserted, is assembled with the half stator 9. The shape of the piece 14 shown in FIG. 2 can facilitate the assembly and ensure the proper closing of the elementary magnetic circuit.

The structure of the yoke of the present motor is much less critical from the standpoint of the dimensional tolerances than a construction in which the yoke would consist of a cylindrical tube. The yoke parts can be made using commercially available sheets, through very simple cutting and bending operations, the tolerance for the curvature radius being relatively high, due to the flexibility of the sheets, while the diametral accuracy of a cylindrical tube implies a relatively high cost. Further, the shown structure enables the construction of a laminated yoke to be carried out very easily and at a low cost, and ensures a good dissipation of the heat on the important metallic surfaces which are in contact with the ambient air. Because the magnetic fluxes are directed axially in the yoke parts, the present structure provides magnetic circuits which are practically independent, thereby enabling the construction of motors in which the coils can be used partly as sensor coils, coils of high-performance di- or tetraphase motors.

I claim:

1. A polyphase synchronous electric motor comprising a rotor part shaped as a plane annular disc, magnetized axially so as to exhibit, on each of its plane surfaces at least one series of magnetic poles disposed regularly along an annular zone, said rotor part being integral with a shaft of the motor mounted rotatably with respect to a stator assembly, this stator assembly comprising at least two groups of polar parts of a substantially plane configuration disposed substantially radially with respect to the motor shaft at least on one side of the rotor part, each of the polar parts forming part of a respective elementary magnetic circuit, having a gap in which is disposed said rotor part, said stator assembly further comprising at least two electric control coils each surrounding at least one of said groups of polar parts, the stator assembly comprising at least two separate yoke parts shaped substantially as portions of the surface of a revolution cylinder, each yoke part being disposed in contact with the polar parts of a group of polar parts, the yoke parts being comprised of magnetically permeable pieces of bent sheet material.

2. A motor according to claim 1, wherein the stator assembly comprises stator support portions of a non-magnetic material into which are inserted the polar parts and which support the yoke parts.

3. A motor according to claim 1, wherein each elementary magnetic circuit comprises two polar parts disposed opposite each other, substantially in a radial plane of the motor on both sides of the rotor part, as well as a portion of a yoke part with which the polar parts are in contact.

4. A motor according to claim 1, wherein each polar part is formed by two pieces of non-magnetic sheet, forming between them such an angle that they are each disposed substantially radially with respect to the motor shaft.

5. A motor according to claim 4, wherein said pieces of sheet are inserted into a slot of the support portion formed so as to determine the angular position of each of the two pieces forming a polar part.

* * * * *

UNITED STATES PATENT AND TRADEMARK OFFICE
CERTIFICATE OF CORRECTION

PATENT NO. : 5,053,667

DATED : October 1, 1991

INVENTOR(S) : Claude Oudet

It is certified that error appears in the above-identified patent and that said Letters Patent is hereby corrected as shown below:

In column 2, line 58, after the words "sensor coils," insert the words --as well as--.

Signed and Sealed this

Twenty-sixth Day of January, 1993

Attest:

STEPHEN G. KUNIN

*Attesting Officer*   *Acting Commissioner of Patents and Trademarks*